US008816853B1

(12) United States Patent
Kelsch et al.

(10) Patent No.: US 8,816,853 B1
(45) Date of Patent: Aug. 26, 2014

(54) SELF-SHUNTING SECURITY DEVICE FOR DETECTING THE ABSENCE OR PRESENCE OF A REMOVABLE AUXILIARY ALARM ASSEMBLY

(75) Inventors: Christopher A. Kelsch, Tarpon Springs, FL (US); John N. Figh, Jr., Oldsmar, FL (US); Thomas J. Beach, Brandon, FL (US); Lucas P. Swartwood, Tampa, FL (US); Bruno M. L. Telles, Tampa, FL (US); Weitong Zhu, Oldsmar, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 335 days.

(21) Appl. No.: 13/050,560

(22) Filed: Mar. 17, 2011

Related U.S. Application Data

(63) Continuation-in-part of application No. 11/563,724, filed on Nov. 28, 2006, now Pat. No. 8,094,019.

(51) Int. Cl.

| | |
|---|---|
| ***G08B 13/12*** | (2006.01) |
| *G08B 13/14* | (2006.01) |
| *G08B 23/00* | (2006.01) |
| *G08B 21/00* | (2006.01) |
| *H01R 13/627* | (2006.01) |
| *G06Q 10/00* | (2012.01) |

(52) U.S. Cl.
USPC .................. 340/568.2; 340/568.1; 340/693.5; 340/687; 439/352; 705/28

(58) Field of Classification Search
USPC ................. 340/568.2, 568.1, 693.5; 439/352; 705/28
See application file for complete search history.

(56) References Cited

U.S. PATENT DOCUMENTS

| | | | | |
|---|---|---|---|---|
| 5,172,098 A | 12/1992 | Leyden et al. | | |
| 5,561,417 A * | 10/1996 | Rothbaum et al. | .......... | 340/568.2 |
| 6,956,479 B2 | 10/2005 | Kelsch et al. | | |
| 2003/0206106 A1 * | 11/2003 | Deconinck et al. | ........ | 340/568.2 |

* cited by examiner

*Primary Examiner* — Jack K Wang
(74) *Attorney, Agent, or Firm* — Andriy Lytvyn; Smith & Hopen, P.A.

(57) ABSTRACT

A self-shunting security system for detecting the absence or presence of a removable auxiliary alarm assembly for preventing theft of one or more products operatively connected to said system. A port is operatively attached to circuitry and is adapted to receive the removable auxiliary alarm assembly. A shunting assembly is also operatively attached to the circuitry and is disposed in relation to the port for detecting the absence or presence of the removable auxiliary alarm assembly within the port. The port and shunting assembly are in parallel electrical configuration. The shunting assembly automatically forms a first closed circuit when the removable auxiliary alarm assembly is not inserted into the port. Insertion of the removable auxiliary alarm assembly into the port opens the first closed circuit and forms a second closed circuit so that tampering with or removing the removable auxiliary alarm assembly opens the second closed circuit creating a moment in time where the second closed circuit and first closed circuit will both be open to activate a warning indicator.

11 Claims, 5 Drawing Sheets

SELF-SHUNTING SECURITY DEVICE FOR DETECTING THE ABSENCE OR PRESENCE OF A REMOVABLE AUXILIARY ALARM ASSEMBLY

CROSS REFERENCE TO RELATED APPLICATION

This application claims priority to, and is a continuation-in-part of, currently pending U.S. Pat. application Ser. No. 11/563,724, entitled "SELF-SHUNTING SECURITY DEVICE," filed on Nov. 28, 2006, the contents of which are hereby incorporated by reference.

BACKGROUND OF THE INVENTION

1. Field of the Invention

This invention relates generally to security systems and anti-theft devices. More specifically, it relates to a self-shunting security device for detecting the absence or presence of a removable auxiliary alarm assembly for use in retail stores, offices, and other establishments to prevent theft of items such as electronic devices.

2. Description of the Related Art

In order to deter and prevent the theft of various items from retail stores, offices and other establishments, various security devices and systems employing sensors and alarms have been developed. The current systems generally fall into two categories, closed loop systems and open loop systems.

Closed loop systems typically include an alarm box, a splitter box having a number of ports, sensors and a power supply. These systems are referred to as closed loop systems because a circuit loop is formed when the sensors are properly attached to the articles at one end and to the ports of the splitter box by way of a plug at the other end. In particular, the sensor is in an opened state when it is not attached to an article to be protected. Attachment to the article causes a sensor switch to close, thereby creating a closed circuit with the sensors operatively connected to the alarm box. Once the sensors are connected, the system may be "armed." As long as the sensors remain attached to the article and operatively connected to the alarm box, the electrical circuit will remain closed and the security system will remain in the armed state. The removal or, in some cases, attempted removal of the sensor from the article acts to open the switch and break the circuit, thereby sounding an alarm.

One of the problems with conventional closed loop systems is that they require shunt plugs to be inserted into unused ports in the splitter box that are not connected to articles in order to complete the circuit and allow the system to be armed. Use of shunt plugs complicates use of the security system because it requires an extra step and the shunt plugs are easily misplaced. Furthermore, as the system will not arm if the plugs of sensors connected to articles or shunt plugs are not occupying all of the ports, there is a risk that lazy or careless employees or personnel may turn off the security device or system (e.g., if one or more of the shunt plugs are lost or misplaced, whereby the system will not arm with the empty port), thereby allowing for possible theft of the articles. The circuit in an open loop system is normally closed when the plugs are inserted into the connections and the sensors are attached to an article, and open upon removal of the sensor from the article. In particular, the sensor switch is typically in an open position when unattached to the article. Attaching the sensor to an article acts to close the switch, thereby allowing current to flow in the circuit. Removal of or tampering with the article's sensor acts to open the sensor switch and actuate the alarm. Any ports that do not have a plug properly inserted therein or that do not have sensors that are attached to articles are considered by open loop systems to be open and therefore not protected by the system.

As an open loop system allows the system to arm even if the ports do not contain either a shunt or a sensor that is attached to an article, one problem with these systems is that it is possible for unscrupulous individuals to manipulate or trick the system in such a way as to permit the articles to be stolen. In particular, an open loop system typically may be circumvented by partially removing the sensor from the article, thereby setting off the alarm if the system is armed. If the personnel monitoring the articles, after turning off the system to quiet the alarm or before turning the system on, does not check to make sure that all of the sensors are properly attached to the articles, when the personnel turns the system back on, the circuit associated with the partially removed plug assembly or improperly attached sensor is therefore open and not protected by the system. Accordingly, the individual can then later come back and remove the article without setting off the alarm. The self-shunting feature of applicant's invention would prevent such 2-step theft. Therefore, there is a need to produce a security device capable of monitoring a variety of different articles that is retailer-friendly, encourages employees to use the system properly, and addresses the problems with the prior systems and devices, while being economical and easy to manufacture.

SUMMARY OF THE INVENTION

The claimed invention is a self-shunting security system for detecting the absence or presence of a removable auxiliary alarm assembly for preventing theft of one or more products operatively connected to said system. The system enables a user to add or remove an auxiliary alarm assembly for added security while maintaining the benefits of a closed loop system and eliminating the need for removable shunt plugs.

Generally speaking, the system includes circuitry, a port, and a shunting assembly. The port is operatively attached to the circuitry and is adapted to receive the removable auxiliary alarm assembly. The shunting assembly is operatively attached to the circuitry and is disposed in relation to the port for detecting the absence or presence of the removable auxiliary alarm assembly within the port.

The port and shunting assembly are in parallel electrical configuration to each other. The shunting assembly automatically forms a first closed circuit when the removable auxiliary alarm assembly is not present in the port. Completion of the first circuit acts to shunt the unused port, thereby eliminating the need for an external shunt plug. Conversely, insertion of the removable auxiliary alarm assembly into the port opens the normally closed shunting assembly and the first closed circuit and forms a second closed circuit. Tampering with or removing the removable auxiliary alarm assembly opens the second closed circuit to activate a warning indicator.

In an embodiment, a primary alarm assembly is operatively attached to the circuitry. The primary alarm assembly is disposed in series electrical configuration with the port and the shunting assembly and includes an open position and a closed position. Tampering with or removing the primary alarm assembly when in the open position opens either the first closed circuit or the second closed circuit to activate the warning indicator.

The shunting assembly may include a mechanical trigger, a light sensor, a laser sensor, a reed switch, or any other means known in the art for detecting the presence or absence of the removable auxiliary alarm assembly within the port. In the absence of the removable auxiliary alarm assembly, the shunting assembly automatically forms the first closed circuit. In an embodiment, the mechanical trigger of the shunting assembly includes a trigger disposed in abutting relation to a spring. The trigger and the spring include a first normally closed position that automatically forms the first closed circuit. The trigger and the spring further include a second open position when the removable auxiliary alarm engages the trigger thereby opening the first closed circuit.

The port and the removable auxiliary alarm assembly each include a respective coupling means. For example, the port may be formed of a male two prong jack, a female computer network jack, a female phone jack, or any other coupling means known in the art; the removable auxiliary alarm assembly may include a female two prong jack, a male computer network jack, a male phone jack, or any other coupling means known in the art. The presence of the removable auxiliary alarm assembly forms the second closed circuit.

The entire system is in communication with a monitoring module. The monitoring module sets off an alarm if a predetermined condition is met, e.g., a circuit is open. The warning indicator may include an audible alarm and/or a visual alarm.

In an embodiment, the security device includes a plurality of systems that are attached to a plurality of articles or merchandise or the like sought to be protected from theft. It should be understood that each of the ports, shunting assemblies, and circuitry are of a similar configuration and that any number of ports, shunting assemblies, and circuitry should be considered as part of the written scope of the claimed invention.

It is therefore an object of the claimed invention to provide a new and improved security system for use in the prevention of theft.

Another object of the claimed invention is to provide a new and improved system for monitoring articles that is retailer-friendly.

Yet another object of the claimed invention is to provide a new and improved security system that enables a user to add and remove a auxiliary alarm assembly for added security while maintaining the benefits of a closed loop system and eliminating the need for removable shunt plugs.

It is yet another object of the claimed invention to produce a security system that is economical and easy to manufacture and use.

Other objects, features, and advantages of the claimed invention will be apparent throughout the specification.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
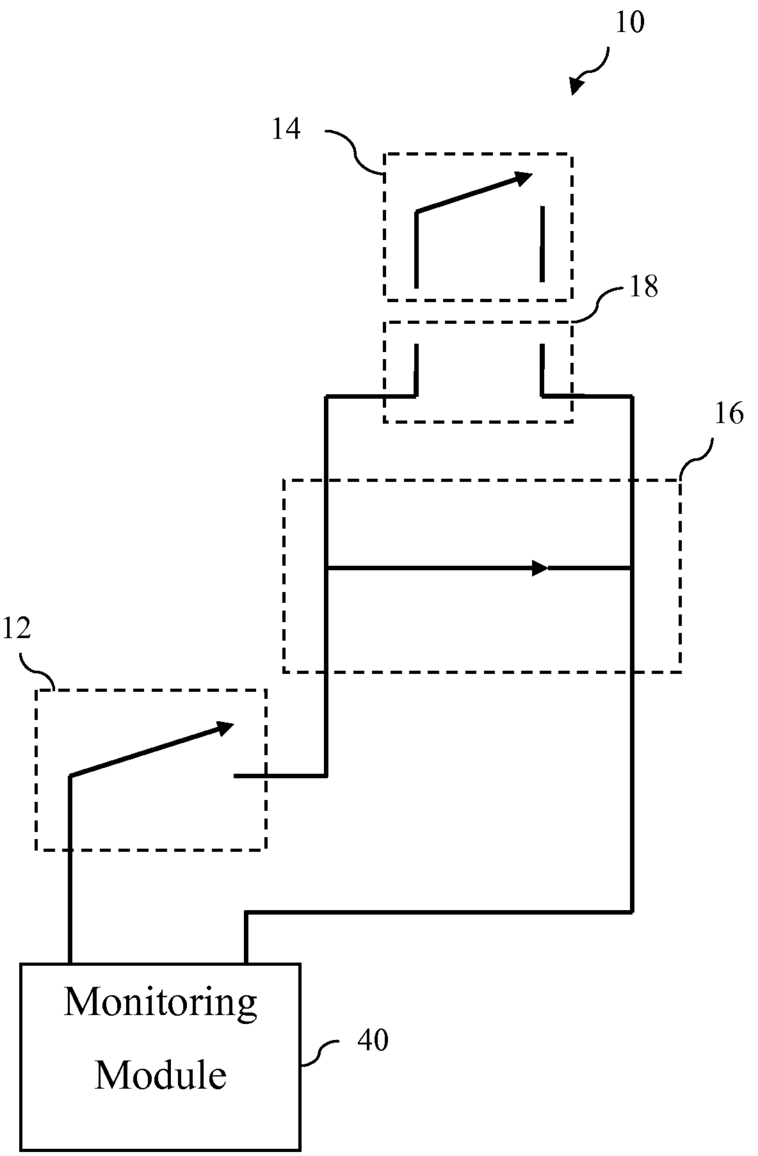
FIG. 1 is an electrical diagram of the system.

Referring to FIG. 1, the system is generally denoted as reference numeral 10. The system 10 includes a primary alarm assembly 12 in series with an auxiliary alarm assembly 14 and a shunting assembly 16. The auxiliary alarm assembly 14 and the shunting assembly 16 are in parallel. The auxiliary alarm assembly 16 is removable from the port 18. The system 10 is monitored by a monitoring module 40. The system 10 enables a user to add and remove the auxiliary alarm assembly 14 for added security while maintaining the benefits of a closed loop system and eliminating the need for removable shunt plugs.

Figure 2:
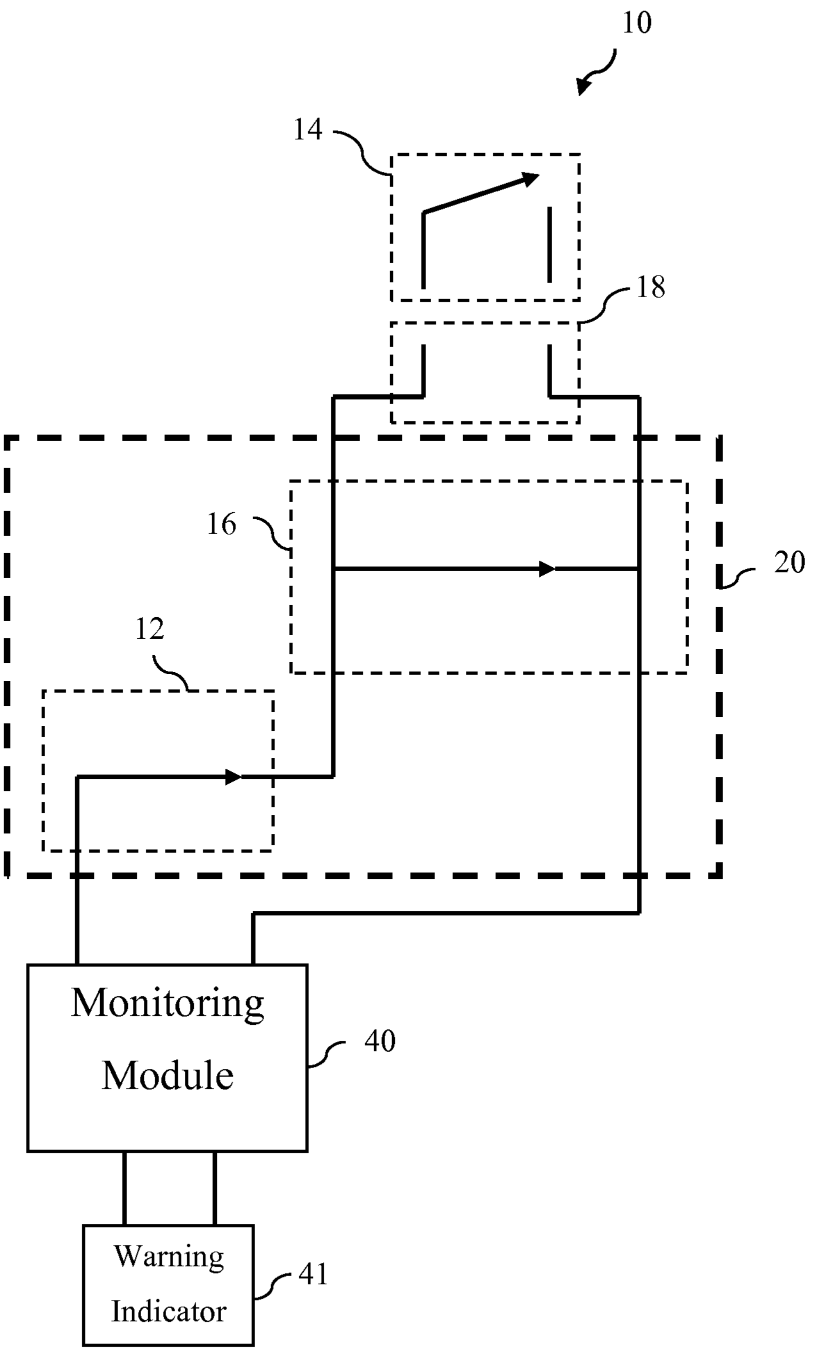
FIG. 2 is an electrical diagram of the system with the auxiliary alarm assembly being open.
Figure 3:
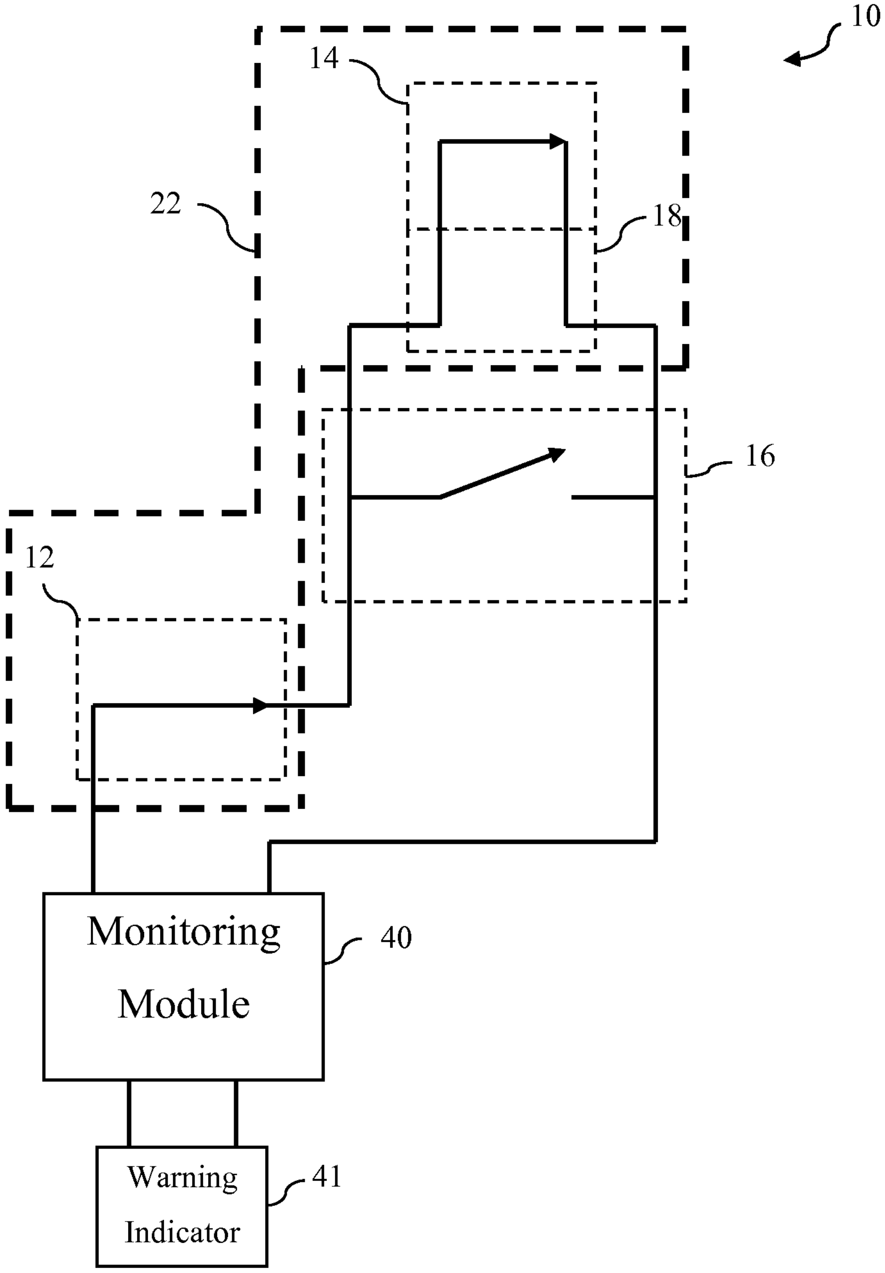
FIG. 3 is an electrical diagram of the system with the auxiliary alarm assembly being closed.

As depicted in FIG. 2, the shunting element 16 automatically forms a first closed circuit 20 with the primary alarm assembly 12 when the removable auxiliary alarm assembly 14 is not present in the port 18. Completion of the first circuit 20 acts to shunt the unused port 18. In this configuration, if the primary alarm assembly 12 is tampered with or removed, the first closed circuit 20 is opened to activate a warning indicator via the monitoring module 40. On the other hand, referring now to FIG. 3, insertion of the removable auxiliary alarm assembly 14 into the port 18 opens the shunting assembly 16 and forms a second closed circuit 22 with the primary alarm assembly 12. Tampering with or removing the removable auxiliary alarm assembly 14 opens the second closed circuit 22 to activate the warning indicator 41 via monitoring module 40. Likewise, if the primary alarm assembly 12 is tampered with or removed the second closed circuit 22 is opened to activate the warning indicator 41 via monitoring module 40.

Figure 4:
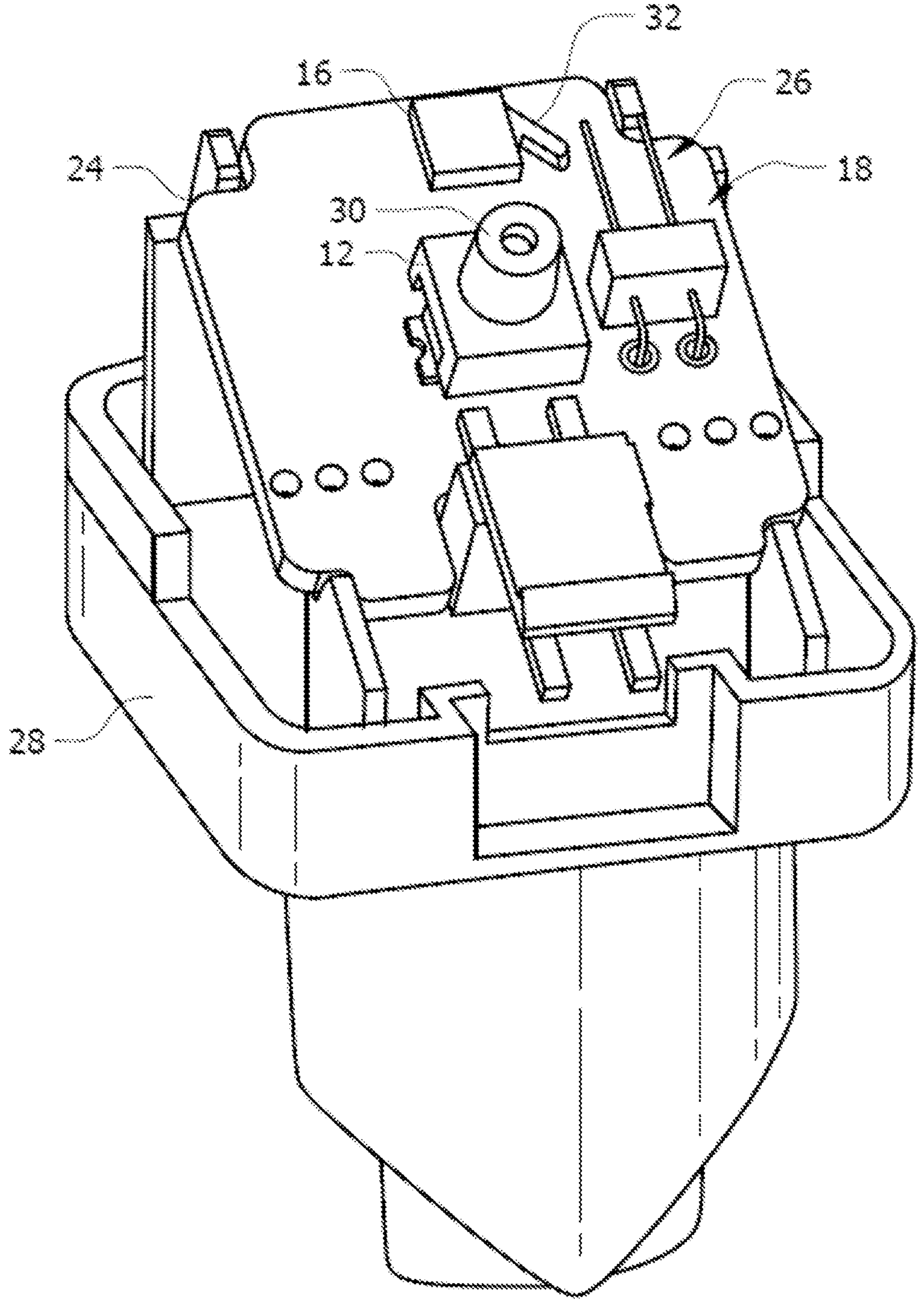
FIG. 4 is an upper perspective view of the system with the auxiliary alarm assembly removed.
Figure 5:
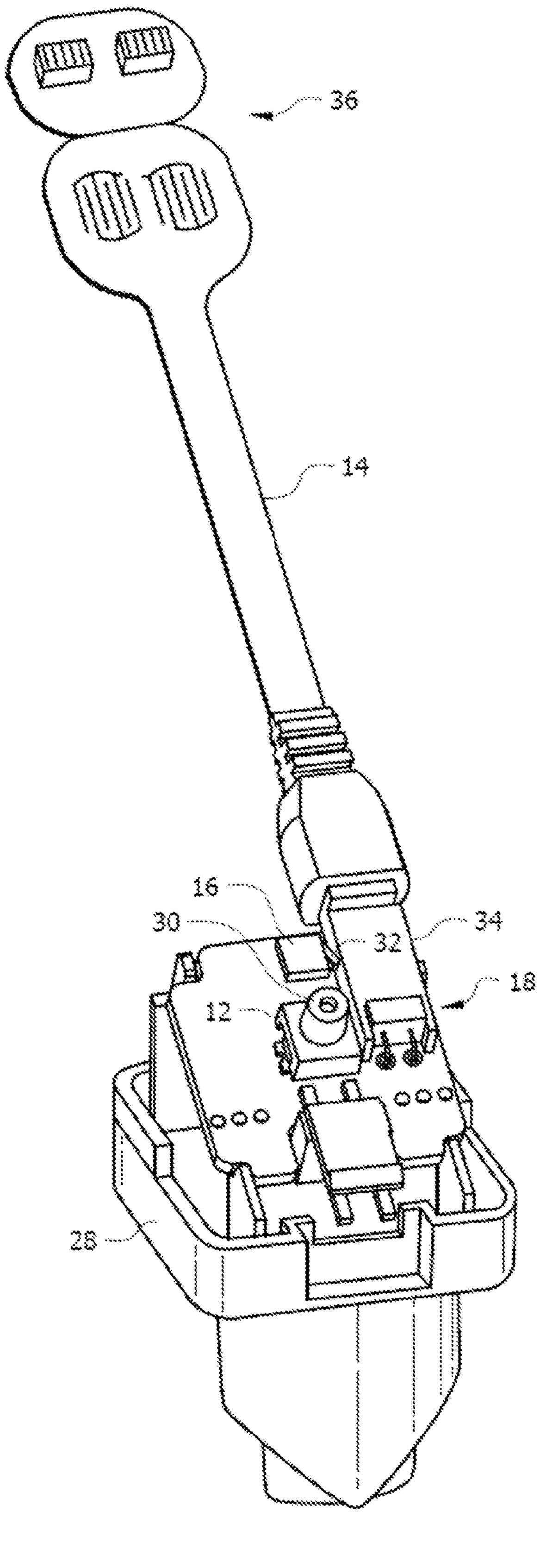
FIG. 5 is an upper perspective view of the system with the auxiliary alarm assembly present.

In an embodiment, as depicted in FIGS. 4 and 5, the system further includes circuitry 24 that interconnects the primary alarm assembly 12, the auxiliary alarm assembly 14, the shunting assembly 16, the port 18, and the monitoring module as described above. The circuitry 24, primary alarm assembly 12, auxiliary alarm assembly 14, shunting assembly 16, and port 18 are stored within a housing 28 (the top of which is not shown for illustrative purposes). The circuitry 24 is in communication with the monitoring module via a conductor. The primary alarm assembly 12 includes a button 30 that is compressed when the housing 28 is attached to an item. When the button 30 is compressed, the primary alarm assembly 12 is closed. The shunting assembly 16 includes a mechanical trigger 32 that is in a normally closed position. When the removable auxiliary alarm assembly 14 is not present in the port 18 and the button 30 of the primary alarm assembly 12 is compressed against an item, the first closed circuit 20 is formed. If the button 30 is disengaged from the item, the first closed circuit 20 is opened to activate a warning indicator via the monitoring module.

The port 18 includes a male two prong jack 26 for receiving and coupling with the auxiliary alarm assembly 14 which includes a corresponding female two prong jack 34. The auxiliary alarm assembly 14 includes a switch mechanism 36 that is attached to an item. When the removable auxiliary alarm assembly 14 is present in the port 18, it engages the mechanical trigger 32, thereby opening the shunting assembly 16 and forming the second closed circuit 22 when switch mechanism 36 is closed. If the button 30 is disengaged from the item, the second closed circuit 22 is opened to activate a warning indicator via the monitoring module. Moreover, if the auxiliary alarm assembly 14 is tampered with or removed, there is a moment in time where the second closed circuit and first closed circuit will both be open before mechanical trigger 32 closes the shunt assembly 16, thereby causing the alarm to activate.

It is appreciated that the primary alarm assembly 12 and the second alarm assembly 14 may include any of the known types of sensors for use with security systems for monitoring articles such as, but not limited to, clips, RJ-type plugs, adhesive strips and housing members, or the like. Examples of sensors are shown in U.S. Pat. Nos. 5,172,098 and 6,956,479, the teaching of which is hereby incorporated by reference. For example, the sensor may include an adhesive sheet having a hole that is placed on and adhered to an article, and a sensor housing having a button that extends into the hole and is biased inward when attached to a product, thereby biasing a first conductor into engagement with a second conductor, similar to the primary alarm assembly as depicted in FIGS. 4 and 5. The removal or, in some cases, attempted removal of the sensor housing from the product causes the first conductor to disengage from the second conductor, thereby breaking the circuit and activating an alarm or other warning. As another example, the sensor may comprise a housing having a passage that permits a removable elongated fastener to extend through the housing and attach the sensor to a surface. When attached to the surface, the elongated fastener engages a pair of contacts within the housing to form an electrical path (i.e., close the circuit), similar to the auxiliary alarm assembly as depicted in FIGS. 4 and 5. Removing or withdrawing the elongated fastener from engagement with the surface acts to break the circuit and activate an alarm or other warning.

The monitoring module may include any means known in the art for monitoring a circuit (e.g., a CPU) to determine if the circuit is open or closed. The monitoring module sets off an alarm if a predetermined condition is met, e.g., a circuit is open. The warning indicator may include an audible alarm (e.g., a horn or siren) and/or a visual alarm (e.g., a blinking light). Moreover, the monitoring module may supply other means to the system including, but not limited to, power, data collection on use and time, etc.

The system may include an indicator informing a user that the auxiliary alarm assembly is being used. If no auxiliary alarm assembly is inserted into the port, the indicator light will not illuminate, thereby indicating which systems are not using an auxiliary alarm assembly. Accordingly, the system of the present invention will notify the user (e.g., retail store personnel) of any auxiliary alarm assemblies that are partially inserted into or removed from the ports to prevent them from being partially removed to enable the product to be later stolen.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A self-shunting security system for preventing theft, comprising:

a housing;

circuitry disposed within said housing;

a port disposed within said housing and operatively attached to said circuitry;

an auxiliary alarm assembly adapted for insertion into said port, said auxiliary alarm configured to engage a merchandise article, wherein disengagement of said auxiliary alarm assembly from said merchandise article activates a warning indicator;

a shunting assembly operatively attached to said circuitry, said shunting assembly being normally closed, said port and said shunting assembly being in parallel electrical configuration, said shunting assembly automatically forming a first closed circuit when said removable auxiliary alarm assembly is not inserted into said port; and a primary alarm assembly disposed within said housing and operatively attached to said circuitry, said primary alarm assembly having a closed position when said primary alarm assembly engages said merchandise article and an open position when said primary alarm assembly is disengaged from said merchandise article, said primary alarm assembly being in series electrical configuration with said port and said shunting assembly, whereby tampering with or removing said primary alarm assembly when in said closed position opens said first closed circuit to activate said warning indicator;

wherein insertion of said removable auxiliary alarm assembly into said port opens said normally closed shunting assembly and said first closed circuit and forms a second closed circuit so that tampering with or removing said removable auxiliary alarm assembly opens said second closed circuit creating a moment in time where said second closed circuit and said first closed circuit will both be open to activate said warning indicator.

2. A self-shunting security system as in claim 1, further comprising:

a status indicator being activated when said second closed circuit is present.

3. A self-shunting security system as in claim 1, further comprising:

said status indicator being a light.

4. A self-shunting security system as in claim 1, further comprising:

said status indicator being an LED.

5. A self-shunting security system as in claim 1, further comprising:

said warning indicator being an audible alarm.

6. A self-shunting security system as in claim 1, further comprising:

said warning indicator being a visual alarm.

7. A self-shunting security system as in claim 1, further comprising:

a plurality of said circuitry, ports, shunting assembly, and removable auxiliary alarm assemblies for protecting a plurality of products.

8. A self-shunting security system as in claim 1, further comprising:

said shunting assembly being chosen from a mechanical trigger, a light sensor, a laser sensor, or a reed switch.

9. A self-shunting security system as in claim 8, further comprising:

said mechanical trigger including a trigger disposed in abutting relation to a spring, said trigger and said spring having a first normally closed position automatically forming said first closed circuit, said trigger and said spring having a second open position when said removable auxiliary alarm engages said trigger.

10. A self-shunting security system as in claim 1, further comprising:

said port and said removable auxiliary alarm assembly each including a respective coupling means.

11. A self-shunting security system as in claim 1, further comprising:

a monitoring module in communication with said circuitry, said monitoring module activates said warning indicator if a condition is met.

* * * * *